June 7, 1938.  W. F. EPPENSTEINER  2,119,857
METHOD FOR REMOVING STORAGE BATTERY PLATES FROM THEIR CASES
Filed March 26, 1935  3 Sheets-Sheet 1

INVENTOR
William F. Eppensteiner,
BY
ATTORNEYS

June 7, 1938. W. F. EPPENSTEINER 2,119,857
METHOD FOR REMOVING STORAGE BATTERY PLATES FROM THEIR CASES
Filed March 26, 1935 3 Sheets-Sheet 2

INVENTOR
William F. Eppensteiner
BY
ATTORNEYS

June 7, 1938.  W. F. EPPENSTEINER  2,119,857
METHOD FOR REMOVING STORAGE BATTERY PLATES FROM THEIR CASES
Filed March 26, 1935  3 Sheets-Sheet 3

INVENTOR
William F. Eppensteiner,
BY
Fraser Myers & Manley
ATTORNEYS

Patented June 7, 1938

2,119,857

UNITED STATES PATENT OFFICE 2,119,857

METHOD FOR REMOVING STORAGE BATTERY PLATES FROM THEIR CASES

William F. Eppensteiner, Rahway, N. J., assignor to The American Metal Company, Limited, New York, N. Y., a corporation of New York Application March 26, 1935, Serial No. 13,105

8 Claims. (Cl. 136—174)

It is well known that storage batteries used in motor cars or the like have a certain salvage value after they cease to be useful. This salvage value consists almost entirely in the metal elements which are contained within the insulating box or casing, such metal elements usually comprising grids or plates commonly constructed of an alloy of lead and antimony or other suitable metals. The boxes or casings are usually constructed of a low grade insulating material and the plates or grids are sealed within the casings by an impervious layer of asphaltum or the like of considerable rigidity and strength, through which are extended the terminals or poles of the battery. To make the recoveries in question requires that the metal parts shall be removed from the casing, and this has been previously done by either breaking up the casing or removing the asphaltum seal by hand. This is a costly and unsatisfactory operation, and renders it difficult to salvage the metallic sludge which usually exists in some quantities at the bottom of the casing.

The principal object of the present invention is to remove the metallic values from the casing in an efficient manner and one which will permit the recovery of substantially all of the values. There is very little salvage to be obtained in the casing itself under the present practices, but the invention possesses the added feature of usually preserving the casing intact so that it may be easily handled and transported to the dump if it is not to be further utilized.

According to the present invention, the removal or stripping of the interior parts is accomplished by utilization of the inertia of such parts. The average battery weighs, all told, approximately 35 to 50 pounds, about 50% of the weight being lead and antimony, about half of which is in the grid and half in spent active material. The casing represents about 20-25% of the total weight, the liners about 10% and moisture the remainder.

The method of removal provided by the present invention comprises the acceleration of the casing by striking it a sudden blow on the open end in a direction which will utilize the inertia of the inside parts to cause them to break through the asphalt seal and thus escape or, preferably, the whole battery may be set in motion so that the inside parts are given a considerable momentum, the casing being then more or less suddenly arrested, or negatively accelerated, thus causing the interior parts to continue in motion and break through the seal. In the preferred form of the invention this is very simply done by dropping the entire battery, a short distance, and suddenly stopping the movement of the casing by arresting it on one or more fixed abutments spaced apart sufficiently to permit the plates, etc. to pass between them.

The invention includes suitable apparatus of simple form for practicing the method thus described, and for thereafter transferring the stripped metal parts to a proper point for transportation or other manipulation, and also includes means for thoroughly washing out the inverted casings and also transferring the latter to an intended delivery point. Such apparatus is not, however, claimed herein, but forms the subject matter of my divisional application, Serial No. 135,904, filed April 9, 1937.

The invention includes other features which will be hereinafter more fully described.

In the drawings which illustrate one form of the invention—

Fig. 7 is a detailed view of the washing mechanism for the battery cases.

Fig. 8 is a section on the line 8—8 in Fig. 7.

Figure 1:
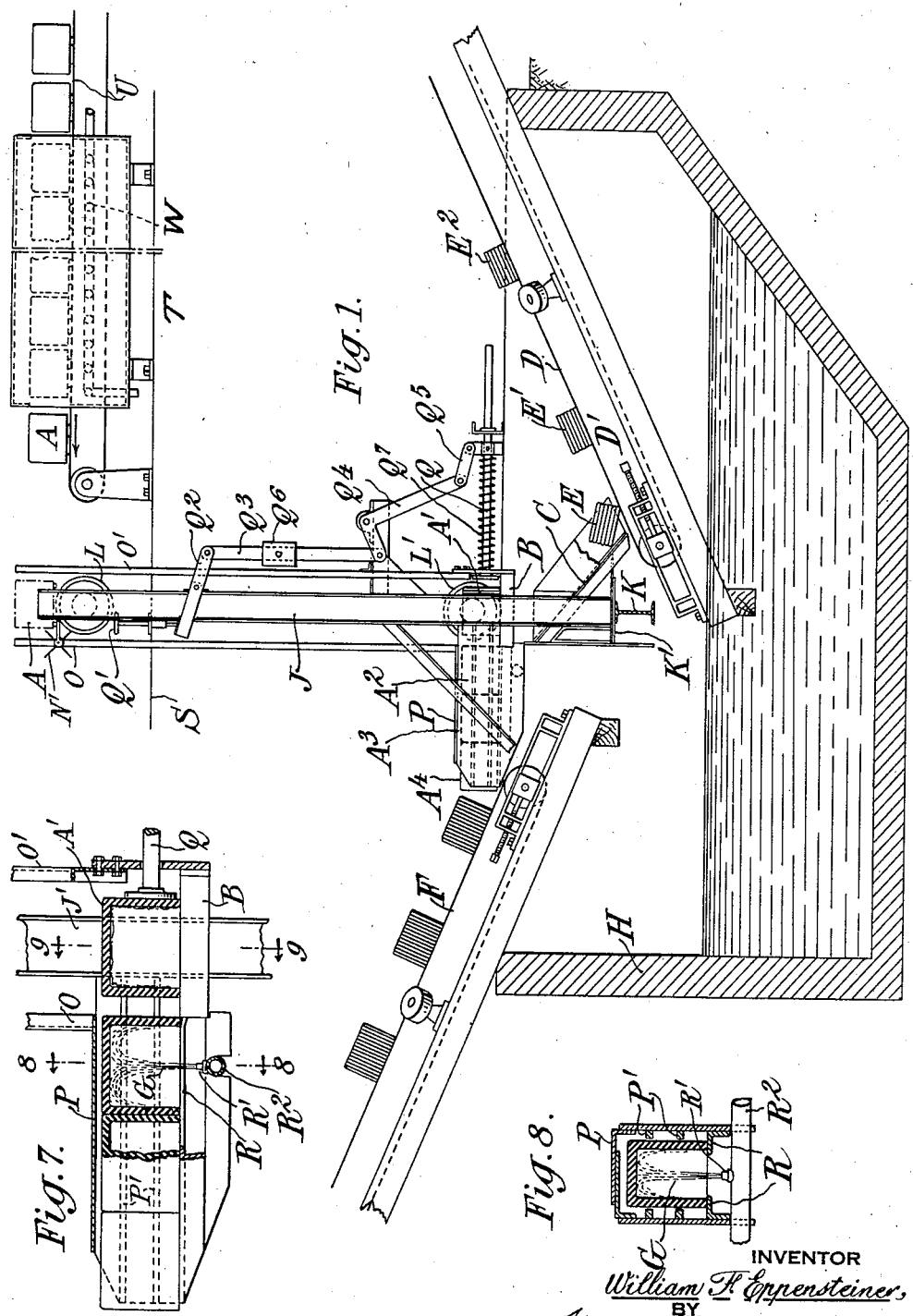
Figure 1 is a side elevation partly in section of an apparatus embodying the principal features of the apparatus.
Figure 2:
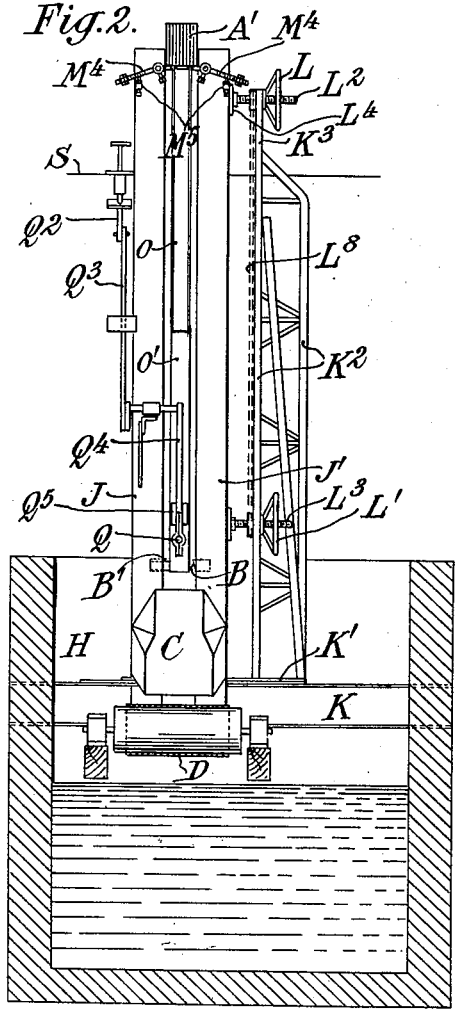
Fig. 2 is an end elevation of the same, also partly in section.

In practicing the method of the invention in its preferred manner, a battery A, shown in dotted lines at the top of Fig. 1, is dropped down a vertical chute, the battery being in such position that its sealed side is downward. When it arrives at the point A', Fig. 1, the casing is arrested by a pair of stops B, B', best shown in Figs. 2 and 9. During the drop, which ordinarily approximates seven or eight feet, the heavy interior parts acquire a certain inertia of motion so that their momentum is sufficiently great to strike a decided blow on the heavy asphalt seal, this blow being sufficient to break through the seal and permit the interior parts to continue downwardly between the abutments B, B'. They are preferably caught on an inclined chute C and guided downwardly to an elevating belt D, as shown at E, E', E² (Fig. 1). The battery casings A', A², A³, etc., being arrested by the abutments B, B', are preferably pushed along a guideway which is continuous with the abutments, and finally are automatically loaded on an elevating belt F. During the transit from the abutments to the belt the casings are preferably thoroughly washed out by an upward jet or jets of water or other suitable liquid as indicated at G in Figures 7 and 8. This cleans the metallic sludge from the interior walls of the casing, the metallic particles in suspension being carried to a sump H from which they are subsequently recovered.

While the manner of practicing the method of the present invention which has just been described is preferred, the inertia of the heavy interior parts can be availed of to remove them from the casing by striking the casing with a heavy and sharp blow along its open edges.

Figure 10:
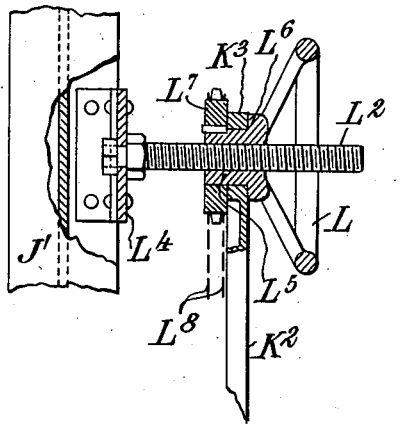
Fig. 10 is a detail of the guide adjusting means.

Referring now in detail to the apparatus illustrated in the drawings, the vertical chute may be very simply constructed by a pair of H-beams J, J', one of which, as J, may be stationary, and the other of which, as J', may be movable for the purpose of accommodating batteries of different dimensions. In the construction shown the entire structure is mounted upon an I-beam K extending across the short dimension of the sump, and having at its top a suitable plate K', upon which the lower ends of the H-beams rest. A trussed framework K² is also supported upon the plate K' and serves as a fixed structure, from which the movable I-beam J' is held erect in its adjusted positions. The adjustment can be conveniently accomplished by means of a pair of hand wheels L, L', which are threaded to operate on fixed screws L², L³, these screws being fastened at their inner ends to plates L⁴ which are rigidly connected to the I-beam J'. The screws pass through the inner member K³ of the frame K², the detailed construction being shown in Fig. 10. As illustrated in this figure, the hand wheels L, L', have hubs L⁵ passing through the member K³, an outside flange L⁶ and an inside collar L⁷, the flange and collar being fixed to the hub in each case. By this construction, the hand wheels L, L', while capable of rotation, are held securely in place, and accordingly the H-beam J' is prevented from movement in any direction in each of its adjusted positions. The invention includes means by which the adjustment of either hand wheel L or L' will move the other, so that the beam J' is always moved inwardly or outwardly to the same extent at top and bottom. A simple method of accomplishing this result is to construct the collars L⁷ as sprockets and to connect them with the chain L⁸ so that the adjustments may be made either by manipulating the upper wheel or the lower wheel. The adjustments may be secured by other means, such as a vertical shaft journalled in the frame K² and carrying eccentrics the straps of which are connected to H-beam J', so that rotation of the shaft will adjust both the top and bottom of the beam simultaneously.

Figures 5, 6:
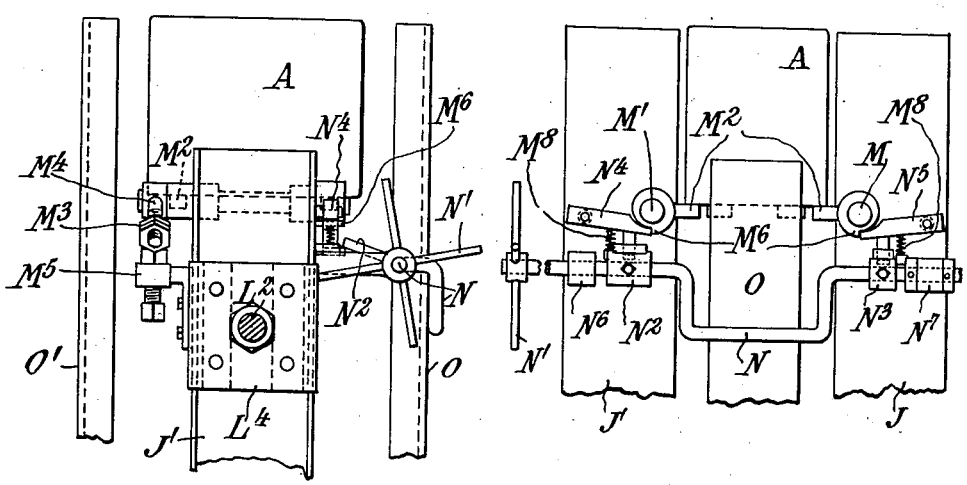
Fig. 5 is a view of one side of the structure of Fig. 3 with the adjusting handwheel and certain other parts omitted.
Fig. 6 is a detailed view of the other end of the structure of Fig. 3.

To facilitate the orderly and properly timed dropping of the batteries down the vertical chute, I provide a supporting and tripping mechanism at the top of the chute, the preferred form of which is best illustrated in Figs. 2 to 6. In this form I make use of two rock-shafts carried by the H-beams J and J', such rock-shafts being designated by the reference letters M, M'. At each end of each rock-shaft is a short supporting arm M², the four arms facing each other and designed to support the battery until released. Each of the arms M², M² has a stop M⁶ upon its hub, each stop being adapted to be engaged by a latch N⁴ or N⁵, as best seen in Fig. 6, the latch preventing the rotation of the rock-shafts M, M', and thus holding the arms M² beneath the battery and accordingly preventing the battery from dropping.

Figure 3:
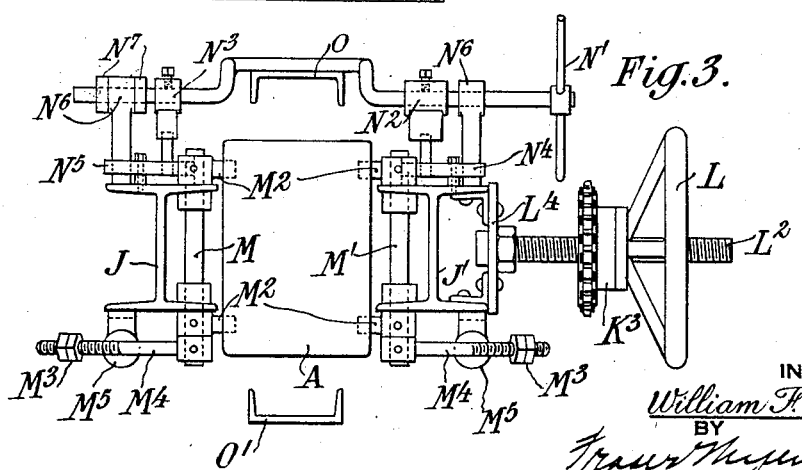
Fig. 3 is a plan view of the upper portion of Fig. 2 drawn to a larger scale.
Figure 4:
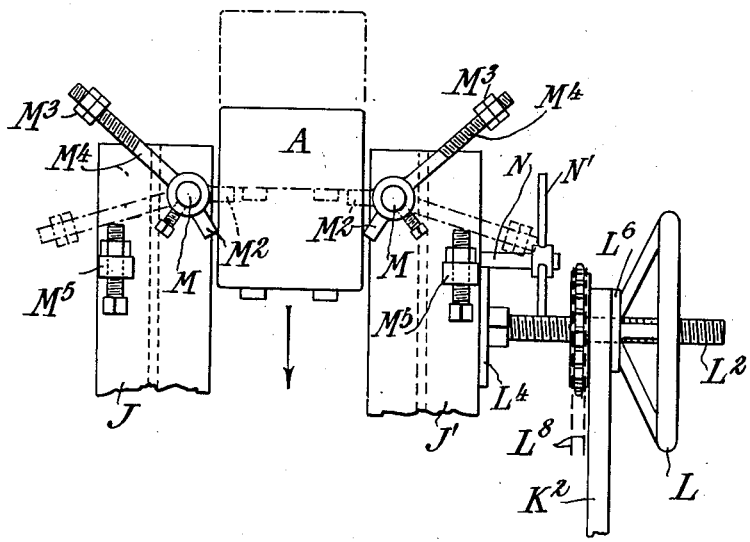
Fig. 4 is a view of one end of the detailed structure shown in Fig. 3, illustrating in its dotted line position, the supporting of a battery at the top of the chute, and in its full line position, the releasing of that battery.

Any suitable means may be provided for releasing the latches N⁴, N⁵ when it is desired to drop the battery. The means shown comprises a shaft N provided with hand levers N', which shaft is held in bearings N⁶, N⁶, fastened to the H-beams J and J', as best seen in Fig. 3. Collars N⁷, N⁷ fixed to the shaft prevent its longitudinal movement. The shaft is offset at about its middle to pass around the channel beam O, as best seen in Fig. 6. Its normal position is that illustrated in the last named figure. The shaft N has fixed to its two fingers N², N³, these fingers being adapted to engage projections on the two latches N⁴ and N⁵, thus moving the two latches downward and releasing the rock-shafts M, M', permitting the latter to rotate and thereby drop the battery. After the battery is dropped, the offset portion on the shaft N by gravity turns the shaft to its normal or inactive position, after the handle N' is released. Each of the rock-shafts M is provided with counter-weights M³, M³ which are mounted upon arms M⁴ fixed to the shaft. When the battery is released these counter-weights rotate the two shafts, bringing the arms M², M² back to their supporting positions, as shown in Fig. 6, the latches N⁴, N⁵ being automatically re-engaged with the stops M⁶, M⁶ under the action of springs M⁸, M⁸. The parts are then ready for the insertion of the next battery.

The finger N² is preferably made wider than the finger N³ in order that it may still engage its latch when the H-beam J' is adjusted to any of its positions.

The channel irons O, O', one of which (O) is utilized to serve as a stop to limit the rocking movement of the shaft N, form end guides for the battery. One of these channel irons is conveniently supported by attachment to the post J and the other by a hood member P, as best seen in Figures 1 and 7.

Figure 9:
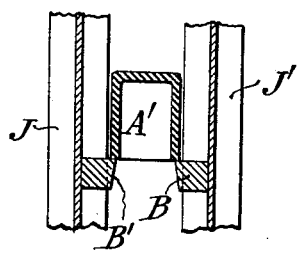
Fig. 9 is a section of the line 9—9 of Fig. 7.

After the battery is dropped by turning the tripping handle N', it falls downwardly until the edges of the battery case strike the abutments B, B', as shown in Fig. 9. The heavy interior parts drop between the abutments onto the inclined chute C and slide down on top of the elevating belt D, the latter being preferably continuously driven and being of any common form having the usual adjusting mechanism D'. Ordinarily, the asphalt seal breaks away from the casing at its edges and remains with the plates, being carried off with the latter on the conveyor D.

The battery case is left momentarily in contact with the abutments B, B', and the invention provides means for displacing it from this position (which is shown in Fig. 9). A simple form of displacing mechanism is shown in Fig. 1, wherein this mechanism comprises a pusher rod Q, suitably guided and adapted to be reciprocated by a leverage system operated by a treadle Q'.

This leverage system may be of any suitable character, comprising, for instance, a lever Q² operating a push rod Q³ connected with the short arm of a bell-crank lever Q⁴, which in turn is connected to the push rod Q by a link Q⁵. The pusher is so limited in its movements that it will move the empty battery box approximately the distance of its own length to a track R (see Fig. 7) which forms a continuation of the abutments B, B'. The track R is arranged at the bottom of the hood P, and is designed to guide the empty cases over to the elevating conveyor F. During the passage of the empty cases through the hood P, the invention provides means for thoroughly washing them, this being accomplished very simply by the jet or jets of water or the like G, passing through a nozzle or nozzles R' on a water supply pipe R². By thus sluicing out the inverted battery cases, all of the sludge which may be adhering to the inside walls of the case is dislodged and falls into the sump H. There are usually some considerable recoveries of metal to be made from the sludge, and in any event the sluicing operation cleans the casings so that they may be better handled in disposing of them in the desired manner. As before stated, such casings have little, if any salvage value, this being due to the fact that the initial construction is cheap and there is usually considerable deterioration during the life of the battery.

During the cleaning operation the hood P serves to restrict the spraying or spattering of the cleaning water, which is rendered more desirable if the jet G is permitted to flow continuously. The hood P may, if desired, be formed with guiding ribs P', and instead of using a single jet to clean out the interior of the case supplementary jets may also be used to clean the exterior as well.

In constructing the device, I prefer to provide a platform S at a level which is conveniently the unloading level of the gondolas or other cars in which the dead batteries are conveyed to the plant. The unloaded batteries may then be moved a short distance to the top of the stripping apparatus, as thus described, and elevated by hand, if desired to the point A, and brought to rest upon the supporting and tripping mechanism. The latter is then actuated and the battery dropped as herein set forth, the lead plates being carried by the conveyor D to an appropriate level to load them automatically upon a flat car by means of which they are transported to a suitable melting furnace.

After each battery is stripped the treadle Q' is depressed by the operator, thus moving the battery case to one side of the vertical chute, to be washed. The treadle is then released so that the plunger recedes under the action of any suitable counterweight Q⁶ or spring Q⁷ or both; a succeeding battery is elevated to the tripping mechanism and the process repeated. The empty casings are carried up on the conveyor F to a dump or other car, depending upon the method of disposal adopted.

It sometimes happens, in cold weather, that the small amount of liquid contained in the casings freezes and interferes with the free dropping out of the plates. Also, when such liquid is frozen it interferes with the thorough washing of the sediment. To obviate these disadvantages, I prefer to provide a heater T, shown in Fig. 1, which comprises a chamber having, for instance, a steam coil W therein, through which the batteries are carried on an endless belt. The delivery point is convenient to the feeding point of the stripping mechanism.

The tracks R, hood P, guides P', and inclined chute C may comprise relatively movable parts, of which those relating to one side of the structure may be secured to and supported by the beam J and those relating to the other side of the structure may be secured to and supported by the beam J', so that when the beams are adjusted by rotation of wheels L, L', to adapt the mechanism for stripping batteries of some particular size, the inclined chute, hood and associated parts of the mechanism will be correspondingly adjusted.

It will be seen that the present invention provides a very simple and effective method of stripping storage batteries and a cheap and uncomplicated apparatus by which the method may be conveniently practiced. The method and apparatus require a minimum of hand labor for rapid and efficient stripping, and result in a saving of a very high percentage of the recoverable values.

While I have shown and described the invention in its preferred form, it will be understood that many changes may be made therein without departing from the spirit of the invention.

What I claim is:

1. The method of separating the parts of a storage battery having a plate section sealed in the open top of a casing without necessarily breaking the latter, which includes the steps of setting the entire battery in rapid motion, and then suddenly arresting only the casing and allowing the rapidly moving plate section to break the seal and escape completely from the casing by its own momentum.

2. The method of stripping a storage battery of the type having a plate section sealed in the open top of a casing without necessarily breaking the latter, which comprises dropping the entire battery with its sealed side directed downwardly, and then suddenly arresting only the casing part of the battery so that the momentum of the plate section may break the seal and permitting this section to escape completely from the casing by gravity.

3. The method of salvaging the component parts of a storage battery having a plate section sealed within the open top of a casing, which comprises dropping the entire battery with its sealed side directed downwardly, then suddenly arresting only the casing part of the battery at one level so that the momentum of the plate section may break the seal and allow this section to escape from the casing by gravity, arresting the plate section at a second level after it has fallen a further distance such as to carry it clear of the casing, and moving the different parts laterally away from each other and from the defined levels for subsequent disposition.

4. The method of salvaging the valuable metallic components of a storage battery having a plate section sealed in the open top of a casing without breaking the latter part, which comprises dropping the entire battery with its sealed side directed downwardly, suddenly arresting only the casing portion, at one level, whereby the plate section may break the seal and escape by gravity, arresting the plate section at a level lower than the first mentioned one so that it and the casing may be moved laterally away from each other, then directing a stream of water upwardly into the inverted casing so as to dislodge sludge collected on the bottom thereof and allow the latter to escape by gravity, and collecting such sludge.

5. The method of stripping a battery according to claim 3 wherein the casing is suddenly arrested after the entire battery has fallen through a distance between 8 and 16 times the height of the battery.

6. The method of stripping a battery according to claim 3 wherein the battery casing is suddenly arrested after it has dropped a distance of from 7 to 8 feet.

7. The method of salvaging the valuable metallic components of a storage battery having a plate section sealed within a casing which comprises the steps of dropping the entire battery with its sealed side directed downwardly, suddenly arresting only the casing portion of the battery at one level whereby the plate section may break the seal and escape by gravity, arresting the plate section at a second level after a further drop such as will clear it from the casing, moving the casing and the section laterally away from each other and from their respective levels, then directing a stream of water upwardly into the inverted casing to wash out sludge as the casing is moved laterally, and collecting such sludge.

8. The method of salvaging a storage battery according to claim 7 further characterized in that the battery casing is suddenly arrested after it has dropped a distance of from 7 to 8 feet.

WILLIAM F. EPPENSTEINER.